United States Patent
Park et al.

(10) Patent No.: US 10,868,302 B2
(45) Date of Patent: Dec. 15, 2020

(54) LITHIUM SECONDARY BATTERY

(71) Applicants: Hyundai Motor Company, Seoul (KR); Kia Motors Corporation, Seoul (KR)

(72) Inventors: SangJin Park, Gyeonggi-do (KR); Seung-Min Oh, Incheon (KR); SungHoon Lim, Gyeonggi-do (KR); Seyoung Lee, Seoul (KR); Shinkook Kong, Seoul (KR); Jung Young Cho, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 64 days.

(21) Appl. No.: 16/200,790

(22) Filed: Nov. 27, 2018

(65) Prior Publication Data

US 2020/0091510 A1 Mar. 19, 2020

(30) Foreign Application Priority Data

Sep. 18, 2018 (KR) .......................... 10-2018-0111637

(51) Int. Cl.
*H01M 4/38* (2006.01)
*H01M 10/0525* (2010.01)
(Continued)

(52) U.S. Cl.
CPC .......... *H01M 4/386* (2013.01); *H01M 4/366* (2013.01); *H01M 4/583* (2013.01); *H01M 4/625* (2013.01);
(Continued)

(58) Field of Classification Search
CPC ......... H01M 10/0567; H01M 10/0568; H01M 4/386; H01M 4/366; H01M 4/583; H01M 4/625; H01M 4/133; H01M 4/134; H01M 4/587; H01M 4/362; H01M 10/0525; H01M 10/0567; H01M 10/0564; H01M 10/0569; H01M 2004/027; H01M 2220/20; H01M 2300/0025; H01M 2300/0034

See application file for complete search history.

(56) References Cited

U.S. PATENT DOCUMENTS

2014/0322591 A1* 10/2014 Yamamoto ............ H01M 4/587
429/164
2015/0086862 A1* 3/2015 Osada ................... H01M 4/366
429/200

(Continued)

FOREIGN PATENT DOCUMENTS

EP 3 373 377 A1 9/2018
KR 2018-0088283 A 8/2018

(Continued)

*Primary Examiner* — Ula C Ruddock
*Assistant Examiner* — Matthew W Van Oudenaren
(74) *Attorney, Agent, or Firm* — Mintz Levin Cohn Ferris Glovsky and Popeo, P.C.; Peter F. Corless

(57) ABSTRACT

Disclosed is a lithium secondary battery capable of preventing the battery life from being reduced. The lithium secondary battery includes a cathode, an anode including silicon, a separator positioned between the cathode and the anode, and an electrolyte including flouoroethylene carbonate (FEC), wherein a weight ratio of the silicon to the FEC is about 0.4 to about 0.8.

8 Claims, 5 Drawing Sheets

(51) Int. Cl.
*H01M 10/0567* (2010.01)
*H01M 4/36* (2006.01)
*H01M 4/583* (2010.01)
*H01M 4/62* (2006.01)
*H01M 4/02* (2006.01)
*H01M 10/0568* (2010.01)

(52) U.S. Cl.
CPC ... *H01M 10/0525* (2013.01); *H01M 10/0567* (2013.01); *H01M 10/0568* (2013.01); *H01M 2004/027* (2013.01); *H01M 2220/20* (2013.01); *H01M 2300/0025* (2013.01)

(56) References Cited

U.S. PATENT DOCUMENTS

| | | |
|---|---|---|
| 2015/0194698 A1 | 7/2015 | Youm |
| 2016/0211514 A1* | 7/2016 | Youm .................. H01M 4/043 |
| 2019/0341654 A1* | 11/2019 | Yu ..................... H01M 10/0525 |

FOREIGN PATENT DOCUMENTS

| | | | |
|---|---|---|---|
| WO | 2014/042485 A1 | | 3/2014 |
| WO | 2018/139808 A1 | | 8/2018 |
| WO | WO2018139808 | * | 8/2018 |

* cited by examiner

LITHIUM SECONDARY BATTERY

CROSS-REFERENCE TO RELATED APPLICATION

This application is based on and claims priority under 35 U.S.C. § 119 to Korean Patent Application No. 10-2018-0111637, filed on Sep. 18, 2018 in the Korean Intellectual Property Office, the disclosure of which is incorporated herein by reference.

TECHNICAL FIELD

The present invention relates to a lithium secondary battery having an improved battery life.

BACKGROUND

In the related art, a lithium secondary battery containing electroactive substance has a higher operating voltage and a high energy density compared to a lead battery or a nickel/cadmium battery. Accordingly, the lithium secondary batteries have been used as energy storage devices for electric vehicles (EVs) and hybrid electric vehicles (HEVs).

In order to improve the traveling distance of an electric vehicle, the battery is required to have a high energy density, and for this, a material used for the battery needs to have improved energy density. Currently, lithium secondary batteries using Ni, Co, and Mn based cathode materials and graphite based anode materials have been developed, and alternative materials that may replace these materials are also being developed to improve limitation in the energy density. For example, silicon having a high energy density with a capacity of 4000 mAh/g greater than that of graphite (360 mAh/g) may has been developed.

SUMMARY

In preferred aspects, provided is, inter alia, a lithium ion battery without deterioration of cell performance by effectively forming a passive film on silicon.

Additional aspects of the invention will be set forth in part in the description which follows and, in part, will be obvious from the description, or may be learned by practice of the invention.

In an aspect of the present invention, provided is a lithium secondary battery including: a cathode; an anode including a silicon component; a separator disposed between the cathode and the anode; and an electrolyte including a fluorinated carbonate. Preferably, the electrolyte may suitably include flouoroethylene carbonate (FEC). Preferably, a weight ratio of the silicon to the FEC may be about 0.4 to about 0.8.

As used herein, the term "silicon component" includes a material including silicon as a major component constituting a content greater than about 10 wt %, 20 wt %, 30 wt %, 40 wt %, 50 wt %, 60 wt %, 70 wt %, 80 wt %, 90 wt %, 95 wt %, or 99 wt % of the total weight of the silicon component. Preferably, the silicon component may suitably include silicon compounds, such as hydrates, carbides and oxides; elemental silicon; and silicon alloys.

As used herein, the term "carbonate" includes a compound having a core structure of carbonate represented by

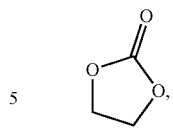

which may be optionally substituted. The fluorinated carbonate may include one or more fluorides, such as one, two, three or four fluorides. Preferred fluorinated carbonate may include one fluoride, or flouoroethylene carbonate (FEC)

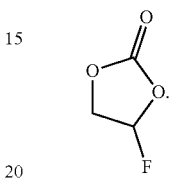

The anode may include a silicon-carbon composite, a first carbon component, and a conductor.

As used herein, the term "carbon component" includes a material including carbon as a main component, for example, constituting a content greater than about 95 wt %, 96 wt %, 97 wt %, 98 wt, 99 wt %, or 99.5 wt % of the total weight of the carbon component. Non-limiting examples of the carbon component may include amorphous carbon, graphite, diamond, fullerene, carbon nanotubes, carbon nanofiber, lonsdaleite, glassy carbon, carbon nanofoam, and carbine.

As used herein, the term "conductor" includes a material having conductivity or transmitting property for heat and/or electricity. Preferably, the conductor may have an electric conductivity, for example, by transferring electrons through or via the material.

Preferably, the first carbon component may suitably include graphite. The first carbon component may be graphite.

The silicon-carbon composite may include the silicon, a second carbon component, and a coating layer. Preferably, the second carbon component may include graphite. The second carbon component may be graphite. Preferably, the coating layer may include carbon.

The electrolyte may include the fluorinated carbonate in an amount of about 5% or greater and less than about 10% by weight based on the total weight of the electrolyte. For instance, the electrolyte may include the FEC in an amount of about 5% or greater and less than about 10% by weight based on the total weight of the electrolyte.

A weight ratio of the silicon to the FEC may be obtained using an absolute amount of the silicon in a cell of the lithium secondary battery to an absolute amount of the FEC in the cell.

The absolute amount of the FEC in the cell may be obtained by Equation 1.

An absolute amount of the FEC in the cell=an amount of injection of the electrolyte×a weight ratio of the FEC relative to an entire composition of the electrolyte  [Equation 1]

The absolute amount of the silicon in the cell may be obtained by Equation 2.

an absolute amount of the silicon=a loading level of the anode per unit area×an area of the anode×a content of an active material×a number of electrode stacks×a content of the silicon in the active material Preferably, the fluorinated carbonate may form a film at an interface between the silicon component of the anode and the electrolyte.

In an aspect, provided is a vehicle may include the lithium secondary battery as described herein.

Other aspects of the invention are disclosed infra.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
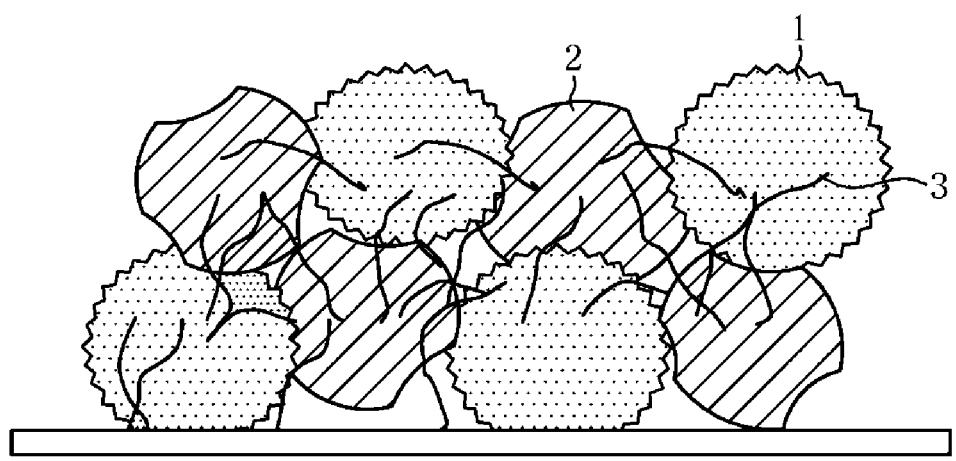
FIG. 1 shows an exemplary structure of an exemplary anode according to an exemplary embodiment of the present invention.

In the following description, not all elements of embodiments of the present disclosure will be described, and description of what are commonly known in the art or what overlap each other in the embodiments will be omitted.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

As used herein, the singular forms "a," "an" and "the" are intended to include the plural forms as well, unless the context clearly indicates otherwise.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following description, a vehicle refers to various devices for moving a subject of transportation, such as a human, an object, an animal, and the like, from a departure point to a destination. Vehicles may include vehicles traveling on roads or tracks, ships moving over the sea or river, and airplanes flying through the air using the action of air.

In addition, a vehicle travelling on a road or a track may be moved in a predetermined direction by rotation of at least one vehicle wheel, including a three or four-wheeled vehicle, a construction machine, a two-wheeled vehicle, a motor device, a bicycle, and a train travelling on a track.

Hereinafter, exemplary embodiments according to the present invention will be described in detail with reference to the accompanying drawings.

Lithium secondary batteries generally include a cathode, an anode, a separator, and an electrolyte. The cathode, the anode, and the separator constituting an electrode structure of the lithium secondary battery according to the present invention may be implemented as a cathode, an anode, and a separator generally used in manufacturing the conventional lithium secondary batteries.

The electrode includes an electrode active material. The electrode may be formed by applying an electrode slurry in which an electrode active material, a solvent, and a conductive material are mixed on a current collector to a predetermined thickness, and then by drying and rolling the electrode slurry applied on the current collector.

An anode active material used for manufacturing the anode may be implemented using any anode active material as long as it can insert and extract lithium ions. The anode active material may include materials that may allow lithium to be reversibly adsorbed or extracted and/or metal materials that may form an alloy with lithium.

Exemplary materials that may allow lithium to be reversibly adsorbed or extracted may suitably include one or more material selected from the group consisting of artificial graphite, natural graphite, graphitized carbon fiber, graphitized mesocarbon microbead, fullerene, and amorphous carbon.

Examples of the amorphous carbon may suitably include hard carbon, coke, or mesocarbon microbeads (MCMB) and mesophase pitch-based carbon fiber (MPCF) calcined at the temperature of about 1500° C. or less. The metal material that may form an alloy with lithium may suitably include one or more metals selected from the group consisting of Al, Si, Sn, Pb, Zn, Bi, In, Mg, Ga, Cd, Ni, Ti, Mn and Ge. These metal materials may be used alone, in a mixture, or in an alloy. In addition, such a metal may be used in the form of a composite mixed with a carbon-based material.

The anode active material may suitably include silicon. Preferably, the anode active material may suitably include a silicon-carbon composite. An anode active material including silicon has a high capacity, but has low lifetime characteristics due to excessive expansion at a time of charging and discharging. Accordingly, the present invention may provide a lithium secondary battery having substantially improved lifetime characteristics by controlling the amount of silicon of the anode active material and the amount of flouoroethylene carbonate (FEC) in the electrolyte.

The anode active material according to an exemplary embodiment may suitably include a silicon component. The silicon component may suitably include one or more of silicon oxides, silicon particles, and silicon alloy particles. For example, the silicon alloy may suitably include a solid solution including i) aluminum (Al), manganese (Mn), iron (Fe), titanium (Ti), and the like and ii) silicon, an intermetallic compound with silicon, and an eutectic alloy with silicon, but the anode active material according to the present invention is not limited thereto.

The cathode active material according to an exemplary embodiment of the present invention may include a compound allowing reversible intercalation and deintercalation of lithium. Preferably, the cathode active material may suitably include i) one or more of composite oxides including lithium and ii) one or more metal selected from the group consisting of cobalt, manganese, and nickel.

The electrode according to an exemplary embodiment of the present invention may further include other components, such as a dispersion medium, a conductive material, a viscosity modifier, and a filler, as additives.

The separator may prevent a short circuit between the cathode and the anode and provide a passage for lithium ions. The separator may suitably include i) a polyolefin-based polymer membrane, for example, including one or more of polypropylene, polyethylene, polyethylene/polypropylene, polyethylene/polypropylene/polyethylene, polypropylene/polyethylene/polypropylene, or a multilayer thereof, ii) a microporous film, iii) woven fabric, or nonwoven fabric that are generally known in the art. Preferably, the porous polyolefin film coated with a highly stable resin may be used for the separator.

The electrolyte may suitably include i) lithium salt and ii) a non-aqueous organic solvent, and may further include additives for improving charge/discharge characteristics, preventing overcharge, and the like. Preferably, the lithium salt may suitably include one or more lithium salts selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$, LiFSI and $(CF_3SO_2)_2NLi$.

The non-aqueous organic solvent may suitably include one or more of carbonate, ester, ether and ketone. Examples of the carbonate may suitably include dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate Propylene carbonate (PC), butylene carbonate (BC), fluoroethylene carbonate (FEC), vinylene carbonate (VC) and the like. The ester may suitably include γ-Butyrolactone (GBL), n-methyl acetate, n-ethyl acetate, n-propyl acetate and the like. The ether may suitably include dibutyl ether and the like. The non-aqueous organic solvent may include a typical non-aqueous organic solvent in the related art, but not limited thereto.

The non-aqueous organic solvent may further include an aromatic hydrocarbon-based organic solvent. Examples of the aromatic hydrocarbon-based organic solvent may suitably include one or more benzene, fluorobenzene, bromobenzene, chlorobenzene, cyclohexylbenzene, isopropylbenzene, n-butylbenzene, octylbenzene, toluene, xylene, mesitylene, and the like.

Preferably, the electrolyte may include fluoroethylene carbonate.

Hereinafter, the lithium secondary battery according to the various exemplary embodiments will be described in detail. In the following description, the unit of measurement is weight % (wt %) unless otherwise stated.

Figure 2:
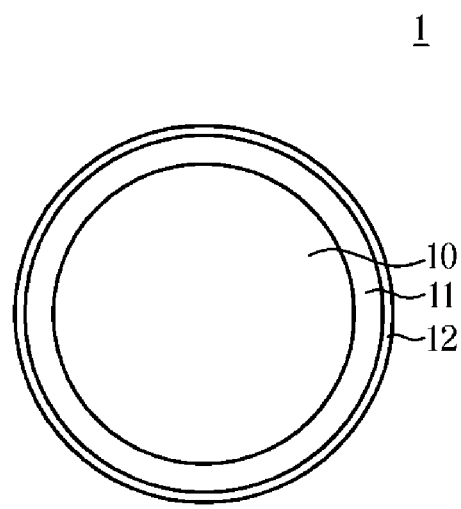
FIG. 2 is a cross-sectional view of an exemplary silicon-carbon composite according to an exemplary embodiment of the present invention.

FIG. 1 shows an exemplary structure of an exemplary anode according to an exemplary embodiment of the present invention, and FIG. 2 shows a cross-sectional view of an exemplary silicon-carbon composite according to an exemplary embodiment of the present invention.

The lithium secondary battery may include a cathode, an anode including silicon, a separator positioned or disposed between the cathode and the anode, and an electrolyte including flouoroethylene carbonate. Preferably, a weight ratio of the silicon to the FEC may be about 0.4 to about 0.8.

The weight ratio of the silicon to the FEC will be further described below.

As shown in FIG. 1, the anode may include a silicon-carbon composite 1, a first carbon component (e.g., graphite) 2, and a conductor 3. For example, the silicon-carbon composite 1, the graphite 2, and the conductor 3 may be active materials of the anode. For example, the silicon-carbon composite 1 may be manufactured by electrospinning a mixed solution including a polymer material and silicon particles to prepare a one-dimensional structure composite, and by heat-treating the composite. The electrospinning may be performed at a humidity of about 36% or less and at a temperature of about 34° C. or less. The electrospinning may be performed by applying a voltage of about 0.5 kV/cm to 3.0 kV/cm using an injection port of about 17 gauge to 25 gauge. The heat treatment may be performed by a primary heat treatment at a temperature of about 230 to 350° C. for about 1 to 10 hours and then a secondary heat treatment at a temperature of about 500 to 900° C. for about 1 to 7 hours. The secondary heat treatment may be conducted under a mixed gas of inert gas and reducing gas.

The polymer material may suitably include one or more selected from the group consisting of polyacrylonitrile (PAN), polyvinyl alcohol (PVA), polyvinylpyrrolidone (PVP), polyethylene oxide (PEO), polyvinylidene fluoride, PVDF), polymethyl methacrylate (PMMA), polyacrylic acid, and polyurethane.

The silicon-carbon composite 1 may suitably include silicon 10, a second carbon component (e.g., graphite) 11, and a coating layer 12. Preferably, the silicon 10 may be provided on the surface thereof with the coating layer 12 coated with amorphous silica ($SiO_2$). For instance, the silicon 10 may be dispersed on the surface of the graphite 11. The silicon-carbon composite according to an exemplary embodiment of the present invention may include a fibrous mixture having a one-dimensional structure, which may superior in conductivity and electrical conductivity of lithium ions compared to silicon metal by being composited with carbon. In addition, volume expansion during insertion of lithium ions may be reduced by amorphous silica and graphite coated on silicon metal particles.

Figure 3:
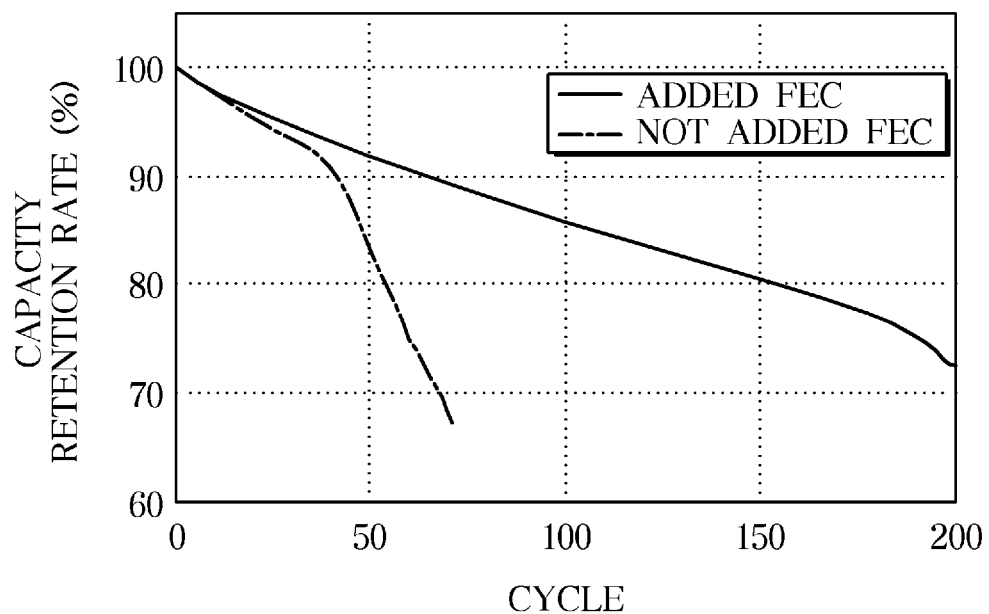
FIG. 3 shows a graph showing the performance of an exemplary cell depending on whether an electrolyte includes fluoroethylene carbonate according to an exemplary embodiment of the present invention.

FIG. 3 shows performance of an exemplary cell depending on whether an electrolyte includes FEC according to an exemplary embodiment of the present invention.

As shown in FIG. 3, the capacity retention rate may sharply decrease when FEC is not included in the electrolyte. FEC may form a flexible film between silicon and the electrolyte to inhibit a reaction that may occur between silicon and the electrolyte. The film may represent a passive film, referred to as Solid Electrolyte Interphase (SEI).

Figure 4:
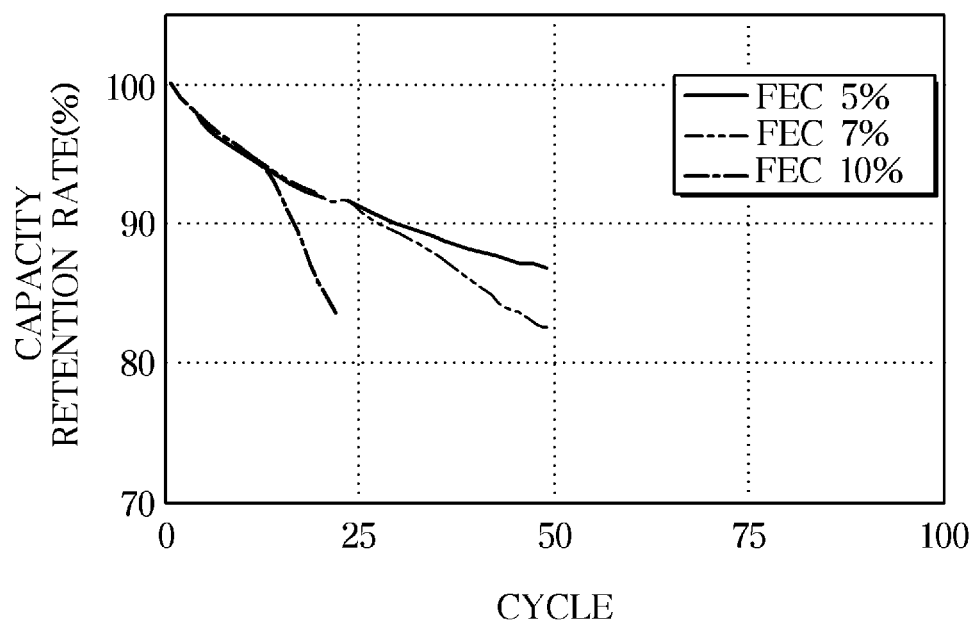
FIG. 4 shows a graph showing the performance of an exemplary cell according to the concentration of fluoroethylene carbonate in an exemplary electrolyte according to an exemplary embodiment of the present invention.

FIG. 4 shows a graph showing performance of an exemplary cell according to the concentration of fluoroethylene carbonate in an electrolyte according to an exemplary embodiment of the present invention.

As shown in FIG. 4, the charge-discharge efficiency may be decreased when FEC is present in an amount of about 10 weight % based on the total weight of the electrolyte.

Preferably, FEC may be present in an amount of about 5% or greater and less than about 10% by weight based on the total weight of the electrolyte. When the content of FEC is greater than about 10 wt %, the charging/discharging efficiency may be decreased due to increase in the thickness of the film, thus the lifetime of the lithium secondary battery may be reduced. When the content of FEC is equal to or less than about 5%, the film may be incompletely formed, thus a subordinate reaction between the silicon and the electrolyte may be increased through a part where the film is broken due to expansion of the silicon volume or the film is not formed, and thus the service life of the lithium secondary battery may be decreased. Accordingly, there is a need to determine an optimum ratio between an absolute amount of silicon and an absolute amount of FEC.

Figure 5:
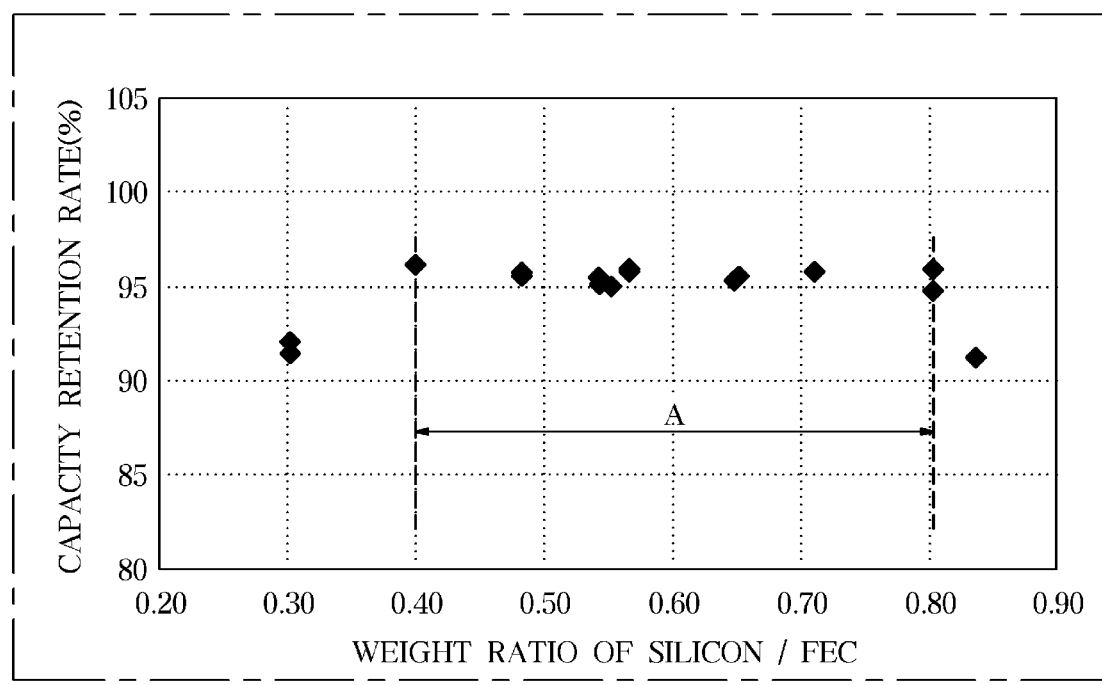
FIG. 5 shows a graph showing cell performance according to a weight ratio of silicon/fluoroethylene carbonate according to an exemplary embodiment of the present invention.

FIG. 5 shows a graph showing cell performance according to a weight ratio of silicon/FEC according to an exemplary embodiment of the present invention.

The weight ratio of silicon to FEC may be obtained using an absolute amount of FEC in the cell and an absolute amount of silicon in the cell. According to an exemplary embodiment of the present invention, the capacity retention rate may be substantially increased when the weight ratio of silicon to FEC is about 0.4 to 0.8.

The absolute amount of FEC in the cell may be obtained by Equation 1.

An absolute amount of FEC in the cell=an amount of injection of the electrolyte×the weight ratio of FEC relative to the entire composition of the electrolyte. [Equation 1]

For example, the absolute amount of silicon in the cell may be obtained by Equation 2.

An absolute amount of silicon in the cell=a loading level of the anode per unit area×an area of the anode×a content of an active material×the number of electrode stacks×a content of silicon in the active material. [Equation 2]

The weight ratio of silicon to FEC may be obtained as the absolute amount of silicon in the cell/the absolute amount of FEC in the cell. The capacity retention rate shown in the y-axis in FIG. 5 may be obtained using the discharge capacity (Ah) in the cycle of implementation/the discharge capacity (Ah) in the first cycle.

As described above, the optimum ratio of the absolute amount of silicon to the absolute amount of FEC may suitably be about 0.4 to 0.8. When the absolute amount of silicon is changed, the cell performance may be prevented from being degraded by properly controlling the absolute amount of FEC according to the change in the absolute amount of silicon to form a passive film on the silicon.

According to various exemplary embodiments of the present invention, a lithium ion battery may be produced without deterioration in performance of a cell by effectively forming a passive film on silicon.

Although exemplary embodiments of the present invention have been described with reference to the accompanying drawings and tables, those skilled in the art will appreciate that these inventive concepts may be embodied in different forms without departing from the scope and spirit of the disclosure, and should not be construed as limited to the embodiments set forth herein. The disclosed embodiments have been described for illustrative purposes and not for limiting purposes.

What is claimed is:

1. A lithium secondary battery comprising:
   a cathode;
   an anode comprising a silicon component;
   a separator disposed between the cathode and the anode; and
   an electrolyte comprising fluoroethylene carbonate (FEC),
   wherein a weight ratio of the silicon component to the FEC is about 0.4 to about 0.8,
   wherein the weight ratio of the silicon component to the FEC is obtained using an absolute amount of the silicon component in a cell of the lithium secondary battery to an absolute amount of the FEC in the cell of the lithium secondary battery,
   wherein the absolute amount of the FEC in the cell is obtained by the following Equation 1:

an absolute amount of the FEC=an amount of injection of the electrolyte×a weight ratio of the FEC relative to the total weight of the electrolyte [Equation 1];

wherein the absolute amount of the silicon component in the cell is obtained by the following Equation 2:

an absolute amount of the silicon component=a loading level of the anode per unit area×an area of the anode×a content of an active material×a number of electrode stacks×a content of the silicon in the active material [Equation 2].

2. The lithium secondary battery of claim 1, wherein the anode comprises a silicon-carbon composite, a first carbon component, and a conductor.

3. The lithium secondary battery of claim 2, wherein the silicon-carbon composite comprises the silicon component, a second carbon component, and a coating layer.

4. The lithium secondary battery of claim 2, wherein the first carbon component comprises graphite.

5. The lithium secondary battery of claim 3, wherein the second carbon component comprises graphite.

6. The lithium secondary battery of claim 1, wherein the electrolyte comprises the FEC in an amount of about 5% or greater and less than about 10% by weight of the total weight of the electrolyte.

7. The lithium secondary battery of claim 1, wherein the FEC forms a film at an interface between the silicon component of the anode and the electrolyte.

8. A vehicle comprising a lithium secondary battery of claim 1.

* * * * *